United States Patent [19]

Bateham

[11] Patent Number: 4,718,673
[45] Date of Patent: Jan. 12, 1988

[54] BALL MANIPULATING APPARATUS FOR GAMES

[76] Inventor: Joseph E. Bateham, Rte. 1, Box 2390, Sylvester, Ga. 31791

[21] Appl. No.: 869,354

[22] Filed: Jun. 2, 1986

Related U.S. Application Data

[63] Continuation-in-part of Ser. No. 730,337, May 3, 1985, Pat. No. 4,615,555.

[51] Int. Cl.$^4$ .................... A63B 53/06; A63B 59/00; B25J 1/06
[52] U.S. Cl. .................... 273/162 E; 294/19.2; 273/67 R
[58] Field of Search ............... 273/67, 162 E; 294/19.2

[56] References Cited

U.S. PATENT DOCUMENTS

| | | | |
|---|---|---|---|
| 216,731 | 6/1924 | MacGregor | 273/162 E |
| 458,614 | 9/1891 | Buddenberg | 294/19.2 |
| 2,394,218 | 2/1946 | Urban | 273/67 R |
| 2,465,124 | 3/1949 | Quattrin | 273/162 E |
| 2,856,190 | 10/1958 | Quattrin | 273/162 E |
| 3,922,027 | 11/1975 | Nesselt | 273/162 E |

Primary Examiner—Randolph A. Reese
Assistant Examiner—John A. Ricci
Attorney, Agent, or Firm—James B. Middleton

[57] ABSTRACT

A ball manipulating apparatus is provided for either pitching a ball, putting a ball, or picking up a ball. There is a shank with a handle on one end, and a putting head and ball holder on the other end. An operating hook is adjacent to the handle so a ball can be easily held or released by a player holding the handle of the device. In one version, the putting head is fixed to the shank, and the ball holder is normally urged away from the putting head. The operating hook can move the ball holder towards the putting head to hold a ball between the putting head and the ball holder. In another version of the device, the ball holder is fixed to the shank, and the putting head is pivoted. The operating hook can then hold the putting head in position for putting.

7 Claims, 6 Drawing Figures

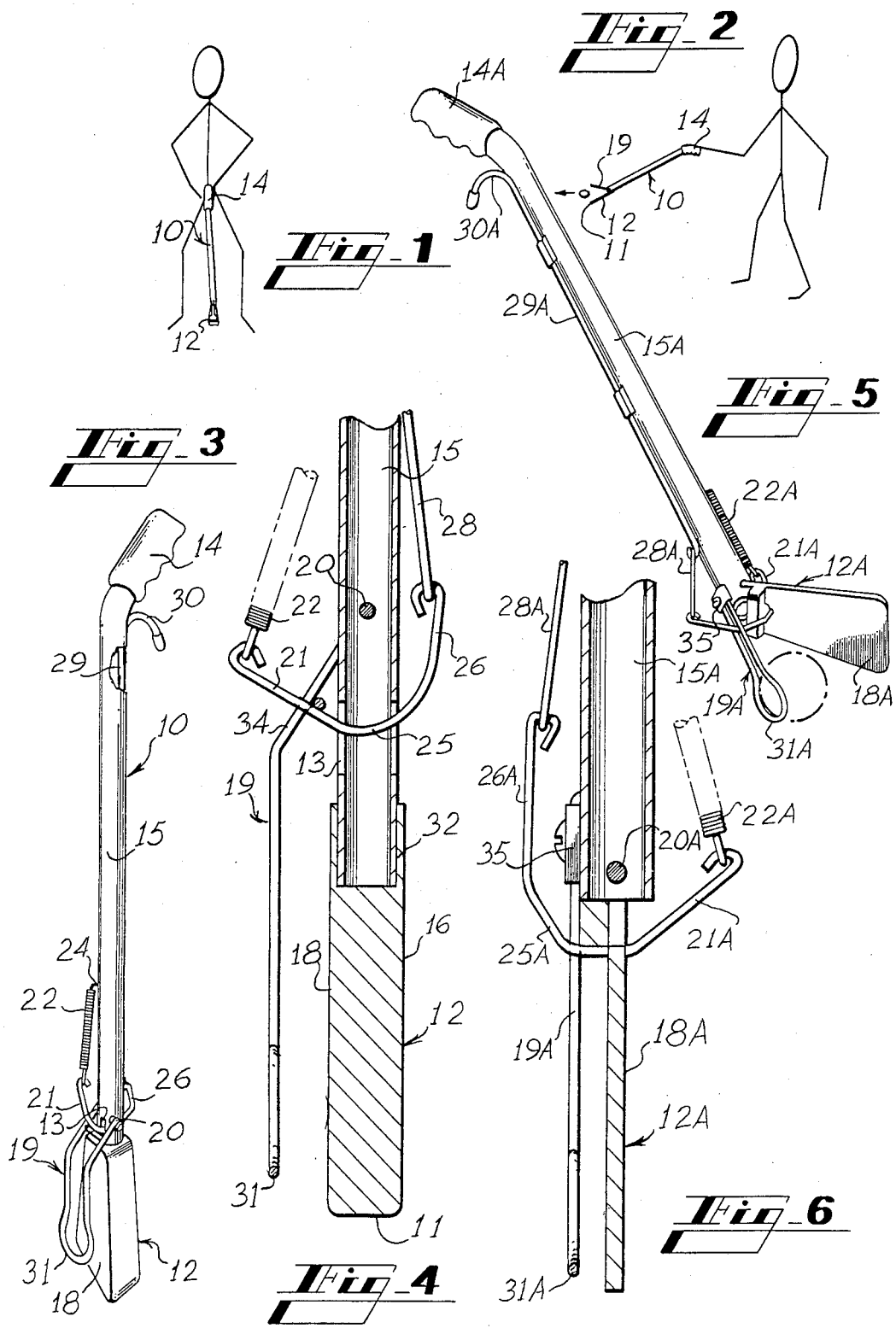

it will be seen in FIG. 3 of the drawings, that a yoke 16 is defined at the lower end of the shank 15, and the putting head 12 is carried by this yoke 16.

BALL MANIPULATING APPARATUS FOR GAMES

CROSS-REFERENCE TO RELATED APPLICATIONS

This is a continuation-in-part of the copending application of the same inventor titled "Pick Up Tool and Jaw Apparatus Therefor" filed May 3, 1985, and assigned Ser. No. 730,337, issued on Oct. 7, 1986 as U.S. Pat. No. 4,615,555.

INFORMATION DISCLOSURE STATEMENT

In the numerous prior art ball games, the apparatus for manipulating the ball is generally in the form of apparatus for striking the ball such as a bat, mallet or club, or in the form of a throwing and/or catching device as is used in games such as jai alai. In view of the limitations on the ball manipulating apparatus, prior games must use a vigorous striking as in baseball or golf, must move the ball very slowly as in croquet, or must utilize throwing and catching as in jai alai. Thus, there is no ball manipulating apparatus to provide for a lawn type game wherein the ball can be moved quickly over long distances, yet utilize a more controlled advancement for greater accuracy.

SUMMARY OF THE INVENTION

This invention relates generally to ball manipulating apparatus, and is more particularly concerned with apparatus that can either strike a ball, as in putting, or pitch or throw the ball.

The present invention provides a ball manipulating apparatus including a shank to be held in the player's hand, and a weighted putting head at the lower end of the shank. The putting head is cooperable with holding means for releasably holding a ball between the holding means and the putting head. Operating means is provided adjacent to the upper end of the shank so the ball can be selectively held and released in the course of the game. In one embodiment of the invention, the putting head is fixed to the shank, and the holding means is pivotal towards and away from the putting head for selectively holding a ball therebetween. In another embodiment of the invention, the holding means is fixed with respect to the shank, and the putting head is pivotal with respect to the holding means for selectively holding a ball therebetween. In either embodiment, the putting head can be used to strike a ball, to move the ball along the playing surface, or the ball can be held between the holding means and the putting head, and the ball can be pitched by appropriate motion of the shank with timed release of the ball.

BRIEF DESCRIPTION OF THE DRAWINGS

These and other features and advantages of the present invention will become apparent from consideration of the following specification when taken in conjunction with the accompanying drawings in which:

FIG. 1 is a rather schematic, front elevational view showing a player utilizing a device made in accordance with the present invention for putting a ball;

FIG. 2 is a somewhat schematic, side elevational view showing a player using an embodiment of the invention for pitching a ball;

FIG. 3 is a perspective view showing one embodiment of ball manipulating apparatus made in accordance with the present invention;

FIG. 4 is an enlarged, longitudinal cross-sectional view through the lower end of the device shown in FIG. 3;

FIG. 5 is a perspective view of a modified form of device made in accordance with the present invention; and, FIG. 6 is a view similar to FIG. 4, but taken through the embodiment disclosed in FIG. 5.

DETAILED DESCRIPTION OF THE EMBODIMENTS

Referring now more particularly to the drawings, and to those embodiments of the invention here presented by way of illustration, it will be understood that the device of the present invention can be used simply to pick up a ball, can be used for putting a ball, and can be used for pitching, or throwing, a ball. FIG. 1 illustrates the putting of a ball, and FIG. 2 illustrates the pitching of a ball. It will be understood that the technique in both actions is somewhat important in view of the construction of the apparatus.

FIG. 1 shows the device 10 being used as a putter. As will be clear from the following discussion, the putting head is so arranged that the manipulating device 10 will be moved forwardly, rather than to the side as in utilizing a golf club or the like. Because of the construction of the device, a stance somewhat as illustrated in FIG. 1 is contemplated. One can stand with feet apart, and the manipulating device 10 held with both hands in front of the player. The device 10 can be swung rearwardly, and moved forward to engage the ball. This general technique of putting will be considered in the following discussion, though it is obvious that variations can be made, and individual players will devise their own techniques.

As is shown in FIG. 2, the manipulating device generally indicated at 10 is of such length that, when a person holds the device 10 by the upper end, the extending end 11 of the device will be substantially at ground level. With this length, and remembering the presence of the putting head 12, it will be realized that a ball cannot be easily or conveniently thrown in an overhead fashion. While individual players may develop particular techniques for pitching a ball using the present ball manipulating device, it is contemplated that the device would be utilized by holding the device in one hand, and swinging the device, with the ball held thereby, somewhat rearwardly of the body. The device will then be swung forward as the player takes a step. Then, as the device 10 reaches the forward position, the ball is released and propelled forward. Again, this general technique will be considered as the pitching technique in the discussion below.

The above identified copending application of the same inventor discloses a pick up apparatus, and the jaw operating mechanism disclosed in the copending application is substantially the same as that utilized in conjunction with the present invention. The disclosure of the copending application, Ser. No. 730,337 is incorporated herein by reference, and the operating mechanisms will be discussed only briefly.

Looking now at FIGS. 3 and 4 of the drawings, it will be seen that the device generally designated at 10 includes a handle 14 extending from the shank 15. The handle 14 is slightly angled with respect to the shank 15 for greater comfort in manipulating the device, though it will be obvious that many variations on the particular handle 14 are possible.

At its lowermost end, the shank 15 carries the putting head 12. It will be seen that the handle 14 is angled towards one flat face 16 of the putting head 12, and the opposite flat face 18 of the putting head 12 has the holding means 19 adjacent thereto for cooperation therewith. The holding means 19 is pivoted at 20 for movement towards and away from the flat face 18 of the putting head 12.

As in the above identified copending application, it will be seen that the holding means 19 is arranged as the movable jaw, and a first operating arm 21 for the movable jaw has a spring 22 connected thereto, the spring 22 also being connected to the shank 15 at 24. Because of this arrangement, it will be understood that the normal position of the holding means 19 will be a position urged away from the putting head 12.

There is a connecting bridge designated at 25 which passes through an appropriate opening 13 in the shank 15, and a second operating arm 26 is connected to the bridge 25. The operating arm 26 has a link 28 connected thereto, the link 28 being in turn connected to the operating link 29 which terminates in a hook 30 adjacent to the handle 14.

It should now be understood by those skilled in the art that the spring 22 will normally urge the holding means 19 to pivot about the pivot point 20 so the flat face 18 of the putting head 12 is unobstructed. In this condition, the putting head 12 can be used as is illustrated in FIG. 1 for putting a ball. Further, with the hook 30 adjacent to the handle 14, a person can grasp the handle 14, and the hook 30 is conveniently disposed for engagement with the forefinger or the like. Motion of the hook 30 will pull the link 29 and connecting link 28 to urge the operating arm 26 upwardly, causing the holding means 19 to pivot about the pivot 20 to be held adjacent to the putting head 12. Thus, a ball can be placed between the flat face 18 and the loop 31 of the holding means 19, and the ball will be held by the device. In pitching the ball as is illustrated in FIG. 2, the manipulating device 10 can be swung forward, and the hook 30 can be released to allow the spring 22 to pivot the holding means 19 away from the putting head 12, and the ball will be released.

It should be noticed that the holding means 19 is located substantially along the vertical centerline of the putting head 12 and the shank 15. The loop 31 of the holding means 19 is therefore centered on the vertical centerline. As a result of this arrangement, it will be recognized that a ball held by the holding means 19 will be substantially centered on the face 18 of the putting head 12.

As was previously mentioned, the manipulating device 10 can be used to retrieve, or pick up, a ball. In picking up a ball with the device 10, one will allow the spring 22 to urge the holding means 19 away from the putting head 12, then pull the hook 30 to urge the holding means 19, and specifically the loop 31, against the ball and urge the ball against the putting head 12. Because the loop 31 is circular it will be understood that the ball will automatically center itself within the loop 31, hence will automatically center on the putting head 12.

As is better shown in FIG. 4 of the drawings, the putting head 12 is formed as a solid piece of metal, and the shank 15 is received within an appropriate opening 32 at the upper end of the putting head 12. It will also be more easily seen in FIG. 4 of the drawings that the preferred arrangement is for the holding means 19 to have its terminal end approximately parallel to the flat face 18 of the putting head 12 when the holding means 19 is in position to hold a ball. In the embodiment here illustrated, the loop 31 of the holding means 19 is of a particular size to hold a golf ball or tennis ball, or other ball in that size range. The angled connector 34 of the holding means 19 can of course be varied, and the diameter of the loop 31 can be varied to achieve the desired relationship for different sizes of balls.

Referring now to FIGS. 5 and 6 of the drawings, it will be seen that the overall apparatus is substantially the same as the device shown in FIGS. 3 and 4 of the drawings, and repetition of the description is not thought to be necessary. Comparable parts will therefore carry the same numerals with an A suffix, and only the differences in structure will be described in detail.

In FIGS. 5 and 6 it will be seen that the operating arm 21A is connected to the putting head 12A, and it is the putting head 12A that is pivotal about the pivot point 20A. The putting head 12A is here shown as a metal plate so the operating arm 21A can be welded or otherwise fixed to the putting head 12A. Also, the connecting bridge 25A extends from the opposite side of the putting head 12A and terminates in a second operating arm 26A. The operating arm 26A is connected to the link 28A as was previously discussed.

The holding means 19A is arranged in the manner of the stationary jaw in the above identified application Ser. No. 730,337. As is discussed in that application, the holding means 19A is formed of wire, and is fixed to the lower end of the shank 15A by a clamping arrangement 35.

With the above discussion in mind, it will be understood that, utilizing the embodiment of the invention disclosed in FIGS. 5 and 6 of the drawings, one would hold the hook 30A to maintain the putting head 12A in the position shown in FIG. 6 so that one could putt a ball. When the ball is to be thrown, or pitched, the ball will be received between the holding means 19A and the putting head 12A, and the hook 30A will be held to retain the ball in that position. On the forward swing when the ball is to be pitched, the hook 30A will be released, and the spring 22A will cause the putting head 12A to pivot, and allow the ball to be released.

With the above description in mind, it should now be recognized by those skilled in the art that the ball manipulating device of the present invention is highly versatile and can be used in many ways in connection with a game.

With the putting head 12 or 12A extending down and the holding means 19 or 19A away from the putting face 18 or 18A, the device 10 is well adapted to putt a ball. It should also be kept in mind that the ball need not be a golf ball as is normally associated with putting, but may be virtually any form of ball. The device 10 can of course be adapted for use with any ball.

Because of the association of the putting head 12 or 12A and the holding means 19 and 19A, a ball can be picked up with the device 10, and the player need not touch the ball. As is discussed above, the ball can be rather casually engaged with the device, and the ball will center on the putting head for accurate control in throwing, or pitching, the ball.

Since the device 10 is admirably adapted for picking up a ball, it will be further understood that the device can be used to retrieve a ball even though the ball is not to be subsequently pitched. In the course of a putting game, the device 10 can be used to retrieve the ball from the cup, as in a golf-type game, and the device is quite useful in removing a ball from bushes, water hazards and the like.

It should also be understood that, as is well disclosed in the copending application, the spring and the operating link can be reversed. Thus, if a player prefer to have the putting head and holding means normally urged together by the spring and released by the hook 30 of the operating means, the parts can be reversed and the desired action will be effected.

Those skilled in the art will devise numerous games utilizing the manipulating apparatus of the present invention. By way of illustration rather than by way of limitation, it will be realized that the ball manipulating device of the present invention is well adapted to a game wherein the object is for one player's ball to strike the opposite player's ball. A player can move his ball over a variety of terrain and at great distances through the pitching technique. At the same time, it will be understood that it will be very difficult to pitch the ball and strike another player's ball. Thus, one might move his ball quickly utilizing the pitching technique, then change to a putting technique for a final engagement with the opposite player's ball.

Similarly, when one player is retreating from another player's advances, the putting technique may be utilized in uniform terrain and for great maneuverability, while a pitching technique may be utilized to cover great distances, and especially over very difficult terrain.

With these basic motions possible utilizing the ball manipulating device of the present invention, it will be understood that the playing field, and the particular rules of the game will be extremely variable, and can be changed to suit the conditions and the players available. Also, it will be understood that the various details of the all manipulating device are variable, especially considering the variety and sizes of balls available, weights of balls available, and the resilience, or rebound characteristics, of balls available.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as defined in the appended claims.

I claim:

1. Ball manipulating apparatus for selectively retrieving, putting and pitching a ball, said manipulating apparatus comprising a shank, a handle at the upper end of said shank, a putting head at the lower end of said shank, said putting head including opposed flat faces, at least one flat face of said opposed flat faces being adapted for striking a ball to effect said putting, and holding means mounted adjacent to one of said opposed flat faces for selectively holding a ball between said holding means and said putting head, said holding means and said putting head being pivotal with respect to each other for allowing a ball to be selectively received between said holding means and said putting head, an operating arm for causing relative motion between said putting head and said holding means, and operating means adjacent to said handle for moving said operating arm, the arrangement being such that a ball can be selectively held between a flat surface of said putting head and said holding means and said ball can be released by operation of said operating means for pitching said ball, and one of said flat faces of said putting head can be used to strike a ball.

2. Ball manipulating apparatus as claimed in claim 1, said putting head being fixed to said lower end of said shank so that said shank can be used to manipulate said putting head for putting a ball, one of said opposed flat faces of said putting head constituting a putting face, said holding means being pivotally fixed to said shank for motion towards and away from said putting face, said operating arm comprising a first operating arm, and further including a second operating arm, said first operating arm extending through an opening in said shank for being positioned adjacent to the rear of said putting head, said second operating arm extending oppositely from said first operating arm, a spring connected between said second operating arm and said shank for urging said holding means away from said putting face.

3. Ball manipulating apparatus as claimed in claim 2, said holding means including a loop sized to engage a ball received between said holding means and said putting face and to hold said ball against said putting face.

4. Ball manipulating apparatus as claimed in claim 3, said loop being substantially circular and in a plane parallel to the plane of said putting face of said putting head, said loop being generally centered with respect to said putting face so that said ball will be centered on said putting face while engaged by said loop.

5. Ball manipulating apparatus as claimed in claim 1, said holding means being fixed to said lower end of said shank, said putting head being pivotally fixed to said shank for selective motion towards and away from said holding means, said opposed flat faces of said putting head constituting a rear face and a putting face, said operating arm comprising a first operating arm, and further including a second operating arm, said first operating arm extending through said holding means for being positioned towards said rear face of said putting head, said second operating arm extending oppositely from said first operating arm towards said putting face, a spring connected between said second operating arm and said shank for urging said putting head away from said holding means, the arrangement being such that said operating means can be used to pivot said rear face of said putting head towards said holding means so that said putting face of said putting head will be in position for putting.

6. Ball manipulating apparatus as claimed in claim 5, said holding means including a loop sized to engage a ball received between said holding means and said putting head and hold said ball between said holding means and said rear face of said putting head.

7. Ball manipulating apparatus as claimed in claim 6, said loop being substantially circular, said loop being located so that said loop is generally centered with respect to said rear face of said putting head when said putting head is pivoted for holding a ball.

* * * * *